INVENTOR.
WOLFGANG RIEDEL
BY
Woodhams, Blanchard & Flynn
ATTORNEYS

June 29, 1965 W. RIEDEL 3,191,882

STORAGE MEANS FOR COLLECTING DATA CARRIERS SERVING FOR CONTROLLING BUSINESS TRANSACTIONS

Filed Jan. 10, 1963 4 Sheets-Sheet 2

INVENTOR.
WOLFGANG RIEDEL
BY
Woodhams, Blanchard & Flynn
ATTORNEYS

June 29, 1965 W. RIEDEL 3,191,882

STORAGE MEANS FOR COLLECTING DATA CARRIERS SERVING FOR CONTROLLING BUSINESS TRANSACTIONS

Filed Jan. 10, 1963 4 Sheets-Sheet 3

INVENTOR.
WOLFGANG RIEDEL
BY
Woodhams, Blanchard & Flynn
ATTORNEYS

June 29, 1965 W. RIEDEL 3,191,882

STORAGE MEANS FOR COLLECTING DATA CARRIERS SERVING
FOR CONTROLLING BUSINESS TRANSACTIONS

Filed Jan. 10, 1963 4 Sheets-Sheet 4

INVENTOR.
WOLFGANG RIEDEL
BY
Woodhams, Blanchard & Flynn
ATTORNEYS

United States Patent Office 3,191,882

Patented June 29, 1965

3,191,882

STORAGE MEANS FOR COLLECTING DATA CARRIERS SERVING FOR CONTROLLING BUSINESS TRANSACTIONS

Wolfgang Riedel, Winnenden, Wurttemberg, Germany, assignor to E. Breuninger K.G.a.A., Stuttgart, Germany, a corporation of Germany Filed Jan. 10, 1963, Ser. No. 250,639
Claims priority, application Germany, Oct. 5, 1962, B 69,109
12 Claims. (Cl. 242—55.13)

For controlling business transactions, more especially movements of materials and goods, wage and costing calculations, data carriers, advantageously cards are being used to an increasing extent, the information being fed into said data carriers when they are prepared in plain language or in a code, for example in the form of perforations, which can be read by a machine (mechanically, photoelectrically, electromechanically, etc.).

These data carriers or cards usually consist of cardboard but can also consist of synthetic plastic or metal plates. The present invention is concerned with a storage means for collecting such data carriers or cards. Storage means are known which collect or assemble such data carriers in a stack, this stack of cards then being supplied to an evaluating device or reader, which takes the data carriers separately from the stack and supplies them to the reading device. These known storage means have the disadvantage that they operate intermittently and therefore the cards are also fed intermittently to the reading device; moreover, these devices operate unreliably if the stacked cards used as data carriers do not have satisfactory edges or are damaged.

The present invention has for its object to provide a simple, continuously operating storage means which does not have the aforementioned disadvantages. The storage means according to the invention for collecting or assembling data carriers in the form of cards or the like consists of a winding spool which can be driven in one direction of rotation, a tape or the like which can be wound onto the said spool and which is drawn from a supply spool during the winding operation, which supply spool can be driven in the opposite direction, and a supply device for the cards which supplies the latter to the winding spool, so that they are wound simultaneously with the tape onto the spool. In this assembling operation, the winding spool is driven. In order to empty this storage means according to the invention and to supply the cards stored on the winding spool to an evaluating apparatus, the supply spool is driven in the opposite direction so that the tape is then unwound from the winding spool.

It is advantageous according to the invention to provide a second tape or the like which can be wound onto the winding spool, so that the cards are introduced between the two tapes and are wound together with said tapes onto the winding spool.

Furthermore, according to the invention, at least one tape of this storage means can consist of magnetisable material which serves as impulse carrier for additional information, sound heads being provided which serves for the recording, erasing and possibly for reproducing the additional information. In this case, not only are the data carriers stored by the storage means according to the invention, but simultaneously also additional information, which is fed through sound heads into the impulse carrier. This method of simultaneously recording and storing additional information on an impulse carrier when collecting data carriers is the subject of my copending application Serial No. 251,778, filed January 16, 1963.

Further details of the storage means according to the invention are more fully explained hereinafter by reference to constructional examples shown in the drawing, wherein.

Figure 1:
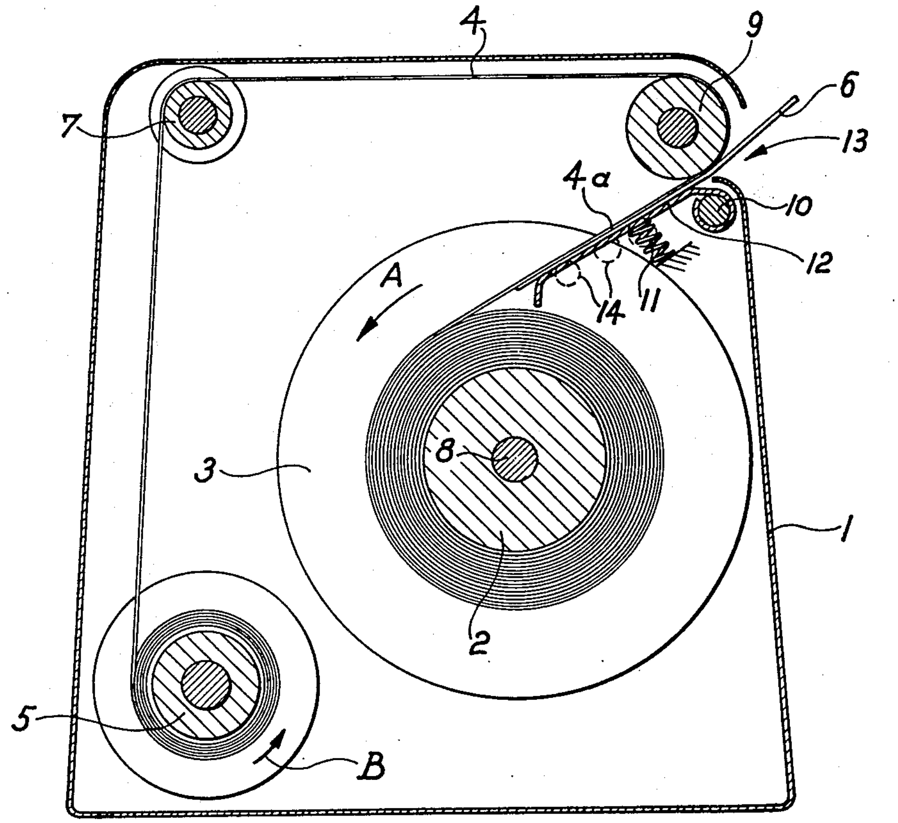
FIG. 1 is a vertical, longitudinal section through a storage means for data carriers.

According to FIG. 1, the novel storage means arranged in a housing 1 consists of a winding spool comprising a spool core 2 and lateral flanges 3, a tape 4 which can be wound on this spool and which is withdrawn in the direction of the arrow A from a supply spool 5 during the winding operation and a feed device for the cards 6 by which the said cards are fed to the winding spool 2 so that they are wound simultaneously with the tape 4 onto the spool. The tape 4 withdrawn from the supply spool 5 is guided over a guide roller 7. The winding spool 2 is fitted on a rotatably mounted shaft 8, which is driven by an electric motor or manually by means of a crank or the like. According to FIG. 1, the feed device consists of a guide roller 9 for the tape 4 and a guide bridge 12 which is pivotally mounted at 10 and which is loaded by a spring 11, the said bridge so cooperating with the section *4a* of the tape leading to the winding spool 2 that the card 6 inserted between this tape section and the guide bridge 12 or into the guide slot 13 is guided up to the winding spool 2. In order to reduce friction, the guide bridge 12 is preferably provided with rollers which are indicated at 14. In the advantageous embodiment shown in FIG. 2, in addition to the aforementioned tape 4, a second tape 16 which can be taken from a supply spool 15 and wound onto the winding spool 2 is so provided in a housing *1a* that the cards 6 are introduced between the two tapes and are wound together with the said tapes onto the spool 2, as will be seen from the drawing. The supply device for the two tapes consists of two guide rollers 9 and 17 arranged in close juxtaposition and in such a way that the tape sections *4a* and *16a* running from these rollers to the winding spool 2 lie one upon the other. In order to guarantee a reliable and uniform transport of the cards to the winding spool 2, the length of the tape sections *4a*, *16a*, from the guide rollers 9, 17 to the winding spool 2 is smaller than the length of the cards 6.

Figure 2:
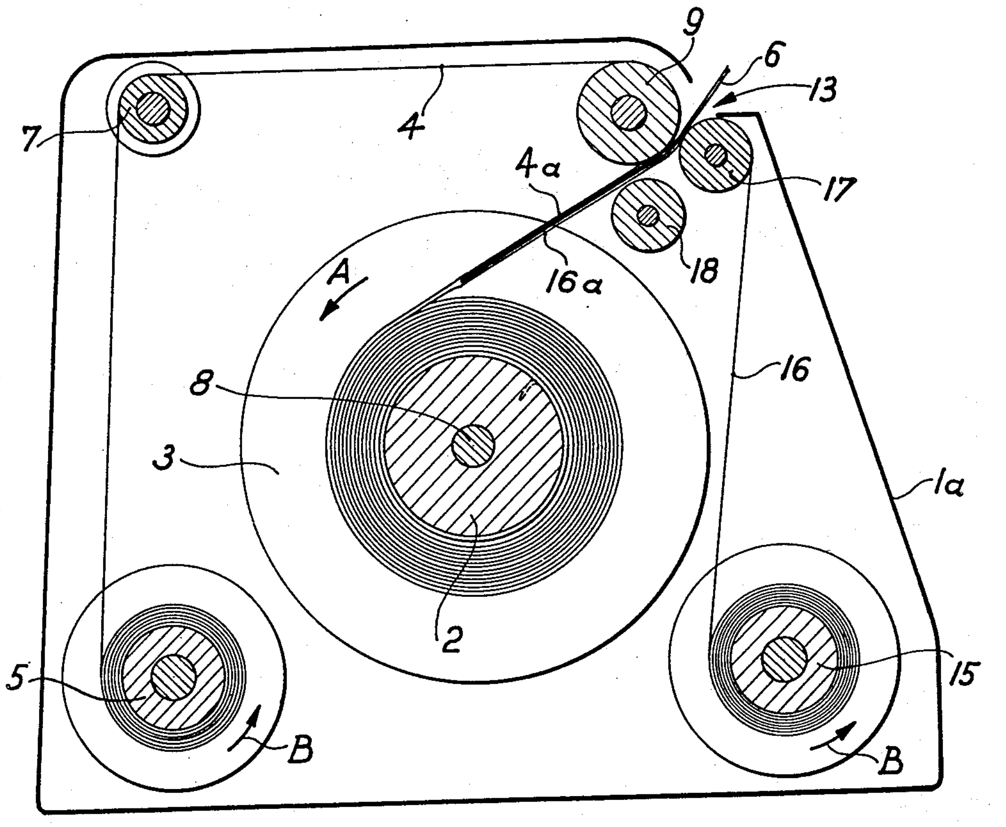
FIG. 2 is the same vertical longitudinal section through another embodiment of such a storage means.

It is also advantageous according to FIG. 2 for a pressure roller 18 to be so arranged between the guide rollers and the winding spool that the tape sections *4a*, *16a* travelling to the winding spool are urged upwardly thereby, so that a sagging of these tape sections is avoided and a reliable conveying of the cards between the two tapes is assured. With this arrangement of the pressure roller 18, the entering or leaving card is at the same time given a concave curvature, as will be seen from the drawing. Since the cards are given a convex curvature on being wound onto the spool core 2, the previously described arrangement of the pressure roller 18 facing the rollers 9, 17 also has the advantage that with the discharge of the cards having convex curvature, these are given a concave curvature and thus are once again straightened.

In order to produce the result that the cards are conveyed at a constant speed, the guide roller 9 (FIG. 1) or one of the guide rollers 9, 17 in the embodiment according to FIG. 2 are driven at a constant speed of rotation. However, since the effective diameter of the spools 2, 5 and 15 and thus the rotational speed thereof is altered during the winding and unwinding operations, slipping clutches are interposed in the drive means of these spools, as will hereinafter be described in greater detail by reference to FIG. 3. The drive is effected in such a way that the tapes 4 and 16 are always tensioned when winding in the direction A or when unwinding in the opposite direction B.

During the unwinding, the spools from which the tapes are unwound are not driven, so that the tapes running off the spools do not sag. This is achieved by a freewheel device not shown in the drawing and fitted between a driving pulley and slipping clutch. Such a freewheel device is operative in the opposite direction with the spool 2 to that with the spools 5 and 15.

Instead of the previously described tapes 4 and 16, it is perhaps possible to provide other similarly acting flexible means such as wires or linked chains.

Figure 3:
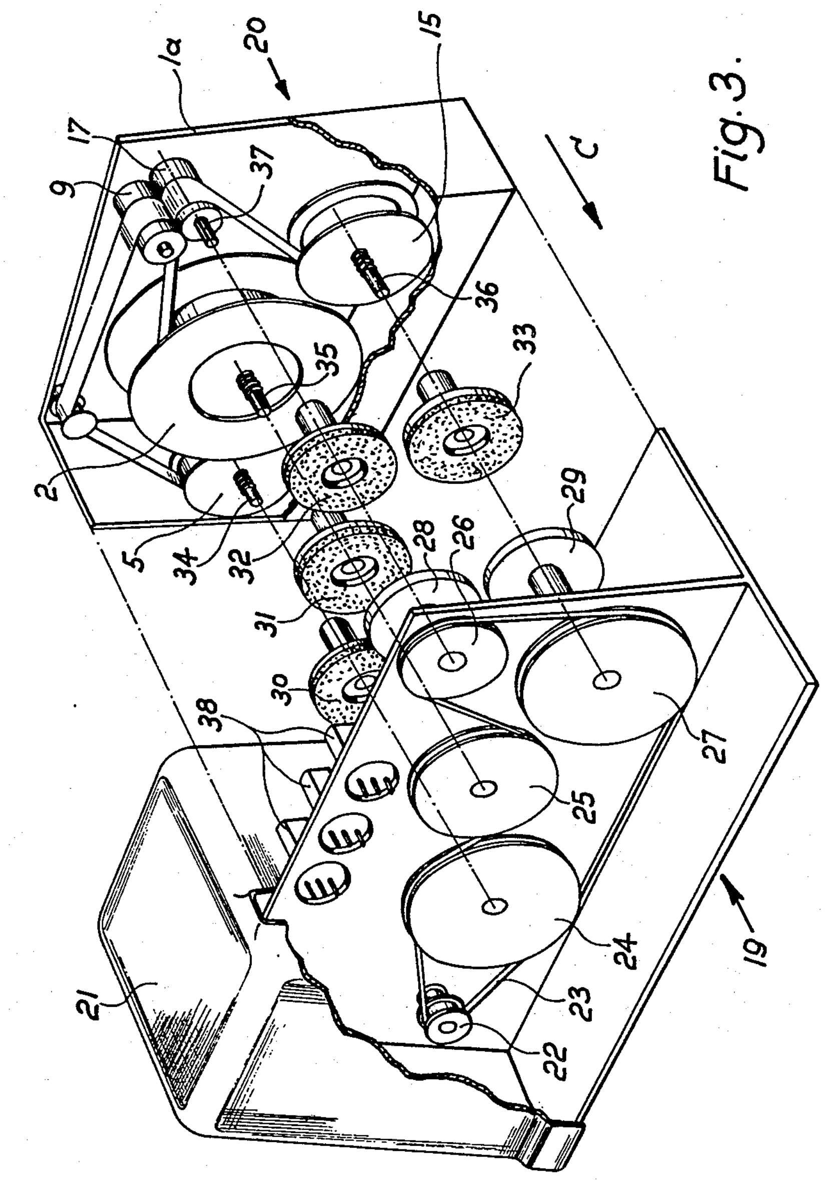
FIG. 3 is a perspective view partly in section, of a storage means comprising a basic instrument and an interchangeable spool magazine (construction according to FIG. 2.

According to the invention, at least one of the previously described tapes serving for the winding of the cards can consist of magnetisable material and serve as an impulse carried for additional information, which is recorded and erased again by means of sound heads, as subsequently described. Such an embodiment is shown in FIG. 3, in which, according to the invention the storage means consists of a basic instrument 19 and an interchangeable spool magazine 20 to be releasably connected to the basic instrument; the spool magazine 20 can be constructed in accordance with FIG. 2 and comprise at least one winding spool 2, the tape-supply spools 5 and 15 and the feed device 9, 17. The drive means for the spool magazine 20 are arranged in the housing 21 of the basic instrument. By means of a pulley 22 and a belt 23, an electric motor drives the belt pulleys 24 to 27, on the shafts of which are mounted discs constructed as slipping clutches, only the discs 28 and 29 being visible. The cooperating discs of these slipping clutches are indicated at 30 to 33 and can be connected by the shafts 34 to 37 to the spools 5, 2, 15 and the guide roller 17, respectively. For this purpose, the spool magazine 20 is pushed in the direction C onto the basic instrument, suitable apertures for the shafts 34 to 37 being provided in the housing 1*a*. The power connection between the drive means disposed in the basic instrument or evaluating instrument and the spools and guide rollers in the interchangeable magazine 20 is effected by the aforementioned slipping clutches, the associated parts of which engage with one another when the magazine is inserted into the basic instrument or evaluating instrument.

Corresponding openings for the sound heads 38 are also provided in the magazine housing 1*a*, the said heads advantageously being arranged in the instrument 19. When the spool magazine 20 is pushed onto the basic instrument, the sound heads 38 are pushed beneath the magnetisable tape or impulse carrier 4. It can be seen from the drawing that by the storage means being split up into a basic instrument and an interchangeable spool magazine, a very simple design of the latter is produced. The magazine 20 can be easily released from the basic instrument and inserted into an evaluating appliance or reader, it being possible for the said reader also to comprise sound heads which serve for the synchronous recording and also cancelling of applied impulses or, when using permanent frequencies for restoring the permanent frequency. If it is not possible for such a spool magazine 20 to be immediately evaluated, the said magazine can be emptied into a correspondingly larger intermediate magazine which has the same design as the spool magazine 20.

Figure 4:
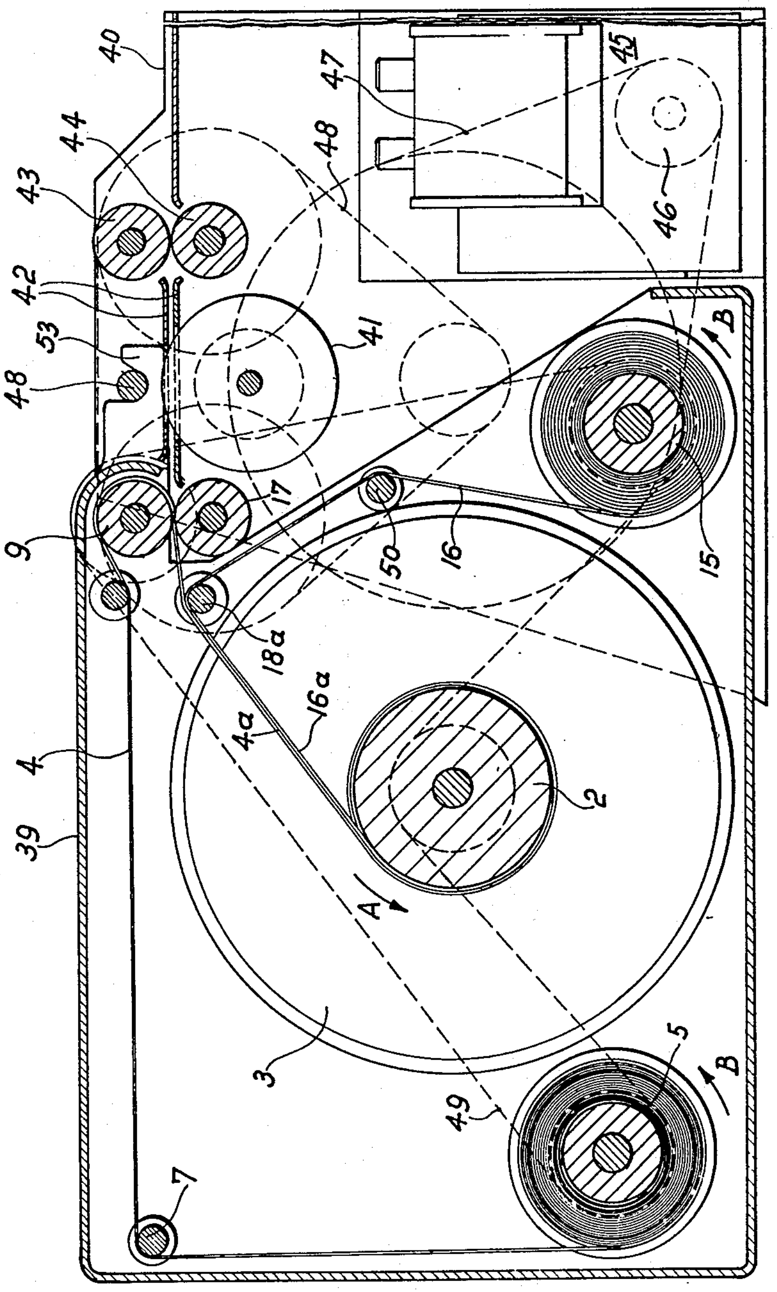
FIG. 4 is a vertical longitudinal section of the combination of a storage means of the type according to FIG. 2 with a cutting means on the input side.

One or more cutting devices, preferably in the form of a circular knife, can possibly be positioned in front of the storage means for cutting the data carrier into two or more sections. One particularly advantageous combination of this type is illustrated in FIG. 4. It is advantageous in this case to provide a common drive for the storage means arranged in a housing 39 and the cutting mechanism arranged in a housing 40. For the storage means according to FIG. 4, which corresponds substantially to the construction of FIG. 2, the same reference numerals are used. The cutting mechanism consists of one or more circular knives 41, two guide plates 42 for guiding the data carrier, and pairs of conveyor rollers 43, 44 and 9, 17 arranged before and after the cutters 41. With the preferred embodiment as illustrated, the conveyor rollers arranged behind the cutter 41 are identical with the feed rollers 9, 17 of the storage means.

By means of a driving pulley 46 and belt drives 47, 48, the motor 45 arranged in the housing 40 drives the feed rollers 44 and 17 for the data carrier and also the cutter 41, as indicated in the drawing. The storage means arranged in the housing 39 is so arranged opposite the housing 40 of the cutting mechanism or is capable of being so suspended on this housing that a driving roller of the storage means (the roller 9 in the example illustrated) is concurrently driven by friction from a driven roller of the cutting mechanism housing, in this case from the driven roller 17. As a result, the two rollers 9 and 17 are pressed one against the other by the actual weight of the housing 39 or even also by spring force. Provided for the suspension of the housing 39 are hooks 53 at both sides, with which the housing 39 is suspended on corresponding studs 48 on the housing 40. The roller 9 driven by the roller 17 drives the winding spools 5, 2, 15 through a belt drive 49. As a modification of the arrangement shown in FIG. 2, the tape 16 drawn off the spool 15 in the arrangement according to FIG. 4 is guided over a guide roller 50 and a pressure roller 18*a*, which serves a similar function to the pressure roller 18.

It can be seen from the drawing that a continuous and satisfactory conveying of the cards during the winding and unwinding operations is produced with the storage means according to the invention and at the same time there is also obtained a satisfactory lateral guiding of the cards by the flanges 3 of the winding spool 2.

What I claim is:

1. Storage means for collecting and assembling cards or similarly constructed data carriers serving for the control of business transactions, comprising:

a rotatable supply spool and a rotatable winding spool and drive means for driving said spools;

a flexible, elongated element having magnetizable material thereon so that it can serve as an impulse carrier for information, said element being movable between said supply spool and said winding spool for being wound thereon;

means for feeding individual data carrier cards one after the other to said winding spool as said element is wound thereon so that said cards can be wound upon said winding spool together with said element and said cards can be delivered when said element is unwound from said winding spool; and sound head means associated with said element for recording and reproducing information on said element.

2. Storage means according to claim 1, including a second, rotatable, supply spool; a second, flexible, elongated element movable between said second supply spool and said winding spool and arranged with respect to the first-named element so that the data carrier cards can be fed between said elements as said elements are wound on said winding spool.

3. Storage means according to claim 2, including guide rollers arranged closely adjacent each other for guiding said elements so that the portions of the elements moving toward said winding spool are disposed one above the other.

4. Storage means according to claim 3 characterised in that a pressure roller is arranged between the guide rollers and the winding spool so that it urges the portions of the elements moving toward the winding spool in an upward direction and at the same time the card moving toward or away from the winding spool is given a concave curvature.

5. Storage means according to claim 3, in which the length of the tape sections from the guide rollers to the winding spool is smaller than the length of the cards.

6. Storage means according to claim 1 in which slipping clutches are interposed in the drive means of the winding spool and the supply spool.

7. Storage means according to claim 1, in which the drive means and the sound head means are mounted in one basic instrument and an interchangeable spool magazine is releasably connected to said basic instrument, said magazine containing at least the winding spool, the tape supply spool and the feeding means.

8. Storage means according to claim 7, in which the power connection between the drive means in said basic instrument and the spools in the interchangeable magazine is effected by slipping clutches, of which associated parts come into engagement with one another when the magazine is inserted in the basic instrument.

9. Storage means according to claim 1, in which cutting means are provided for cutting cards into two or more sections before they enter the storage means.

10. Storage means according to claim 9, characterised in that a common drive means is provided for the spools and the cutting means.

11. Storage means according to claim 9, having pairs of conveyor rollers arranged before and after the cutter means, the conveyor rollers arranged after the cutter mechanism also serving as the feeding rollers for the storage means.

12. Storage means according to claim 7, in which said magazine is so arranged with respect to said basic instrument that a roller of the said magazine frictionally engages and is driven by a driven roller of said basic instrument.

References Cited by the Examiner

UNITED STATES PATENTS 2,328,055 8/43 Clough ------------ 242—67.4 X

MERVIN STEIN, *Primary Examiner.*